UNITED STATES PATENT OFFICE.

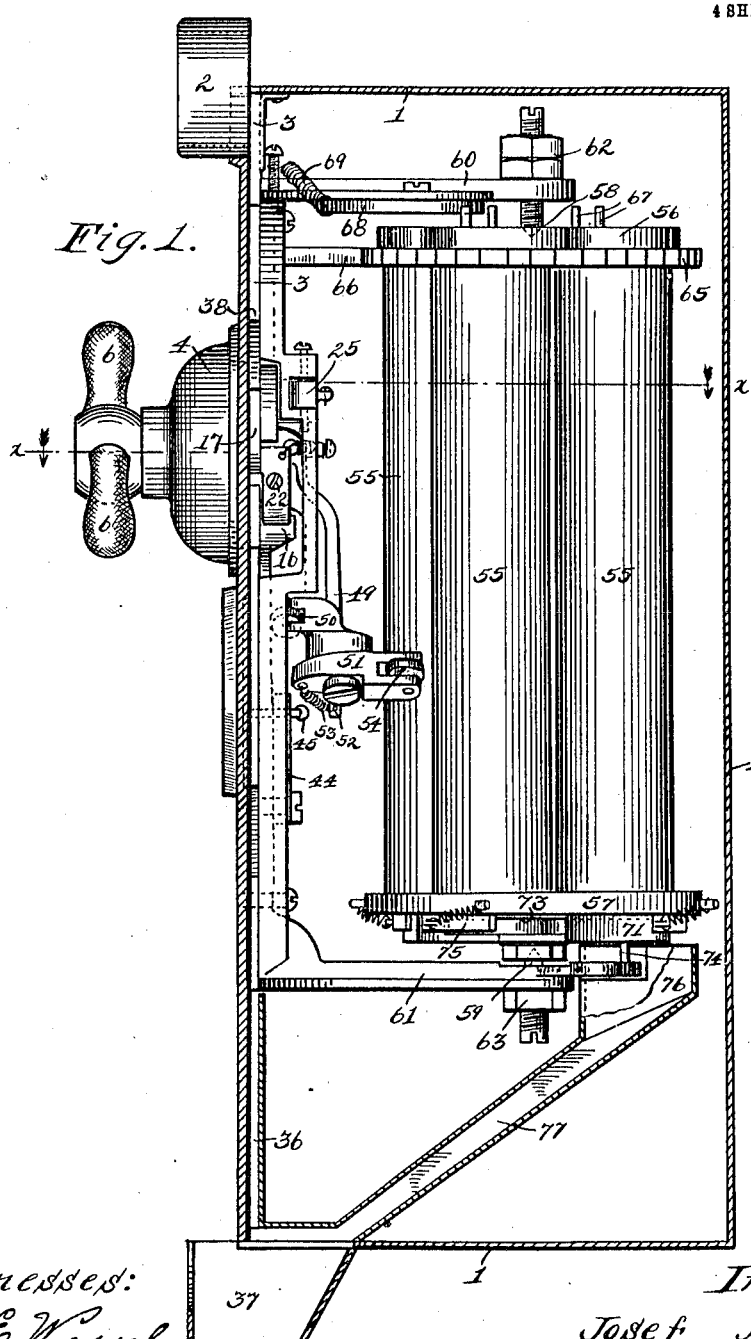

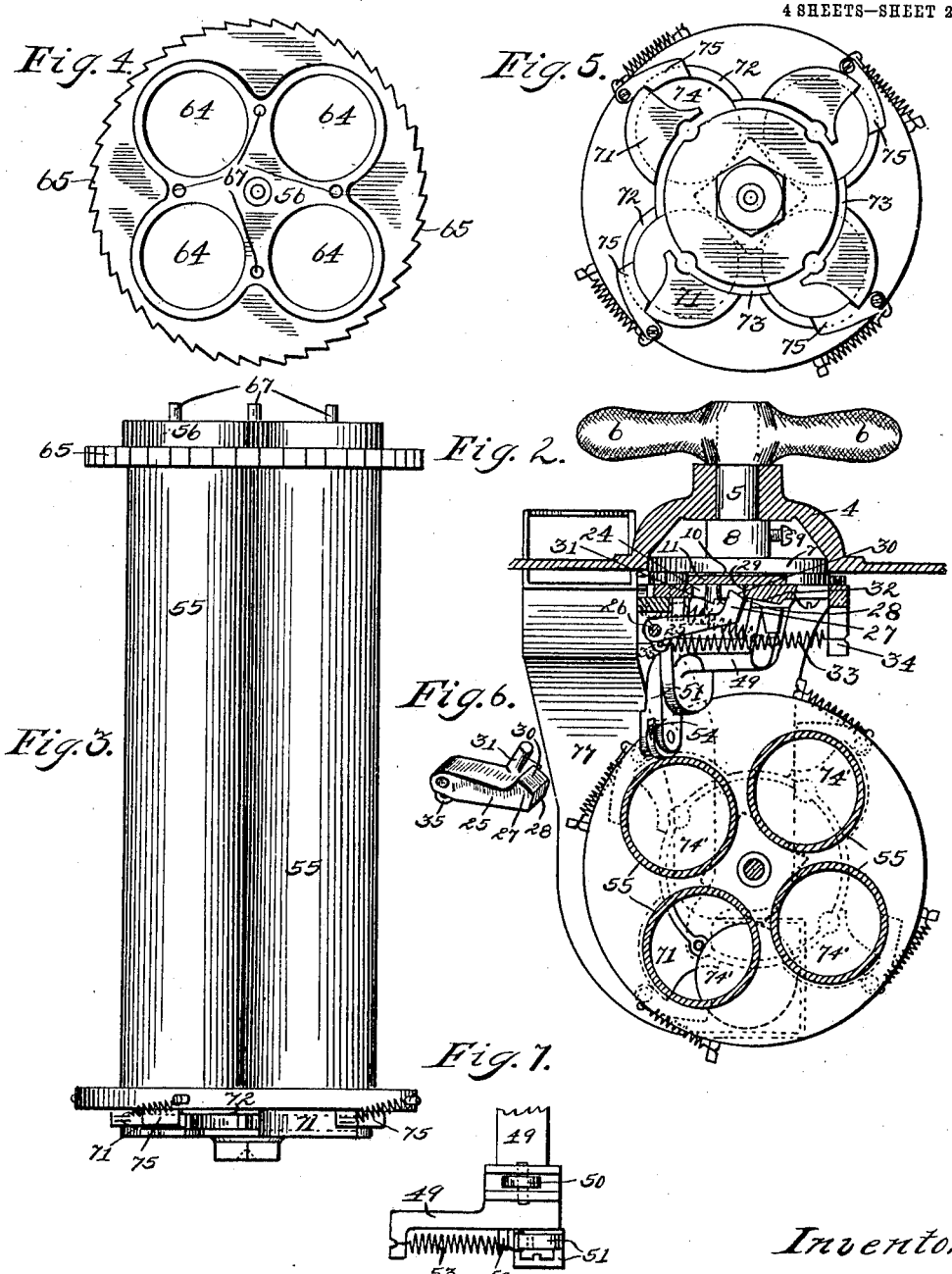

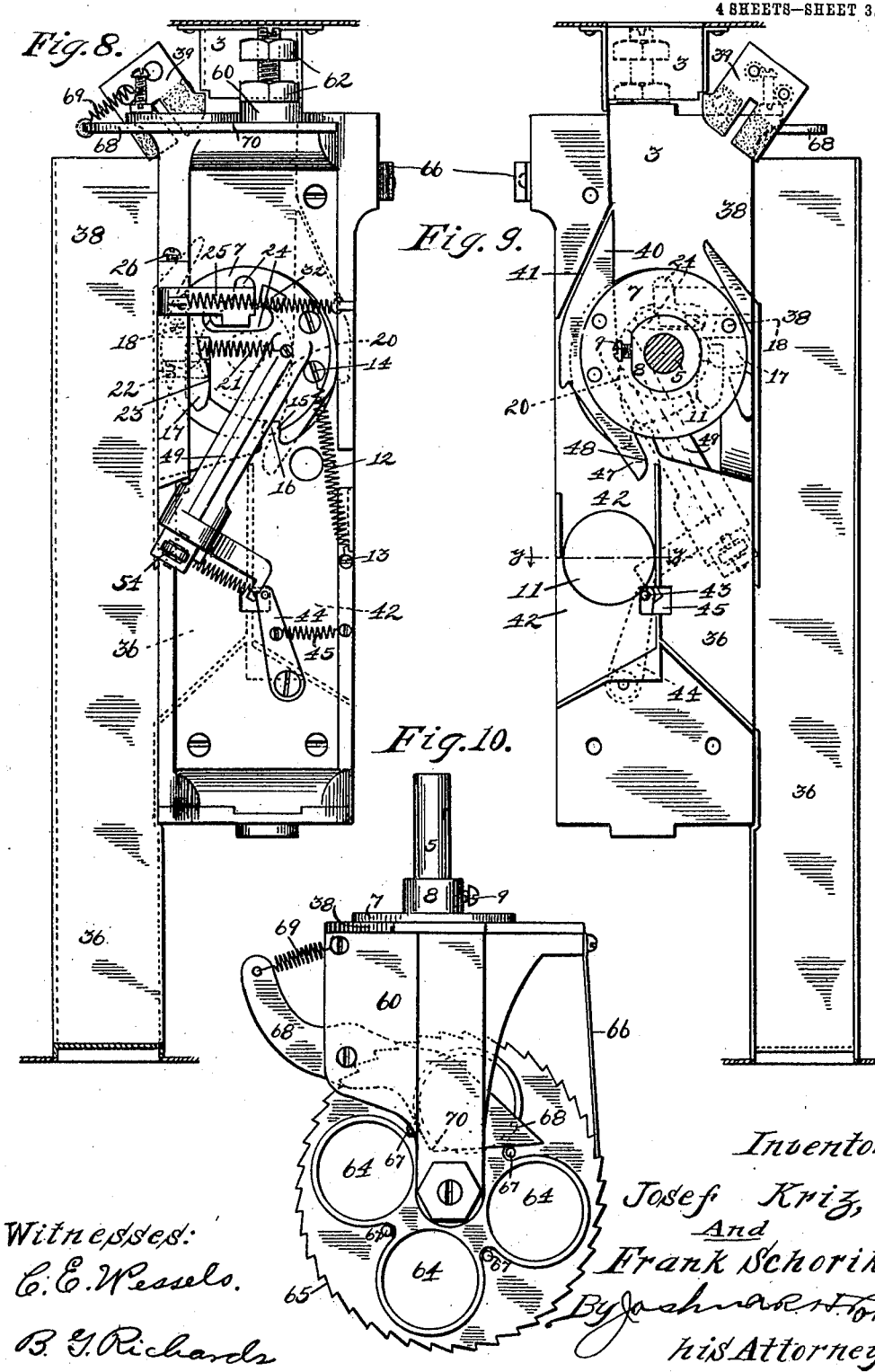

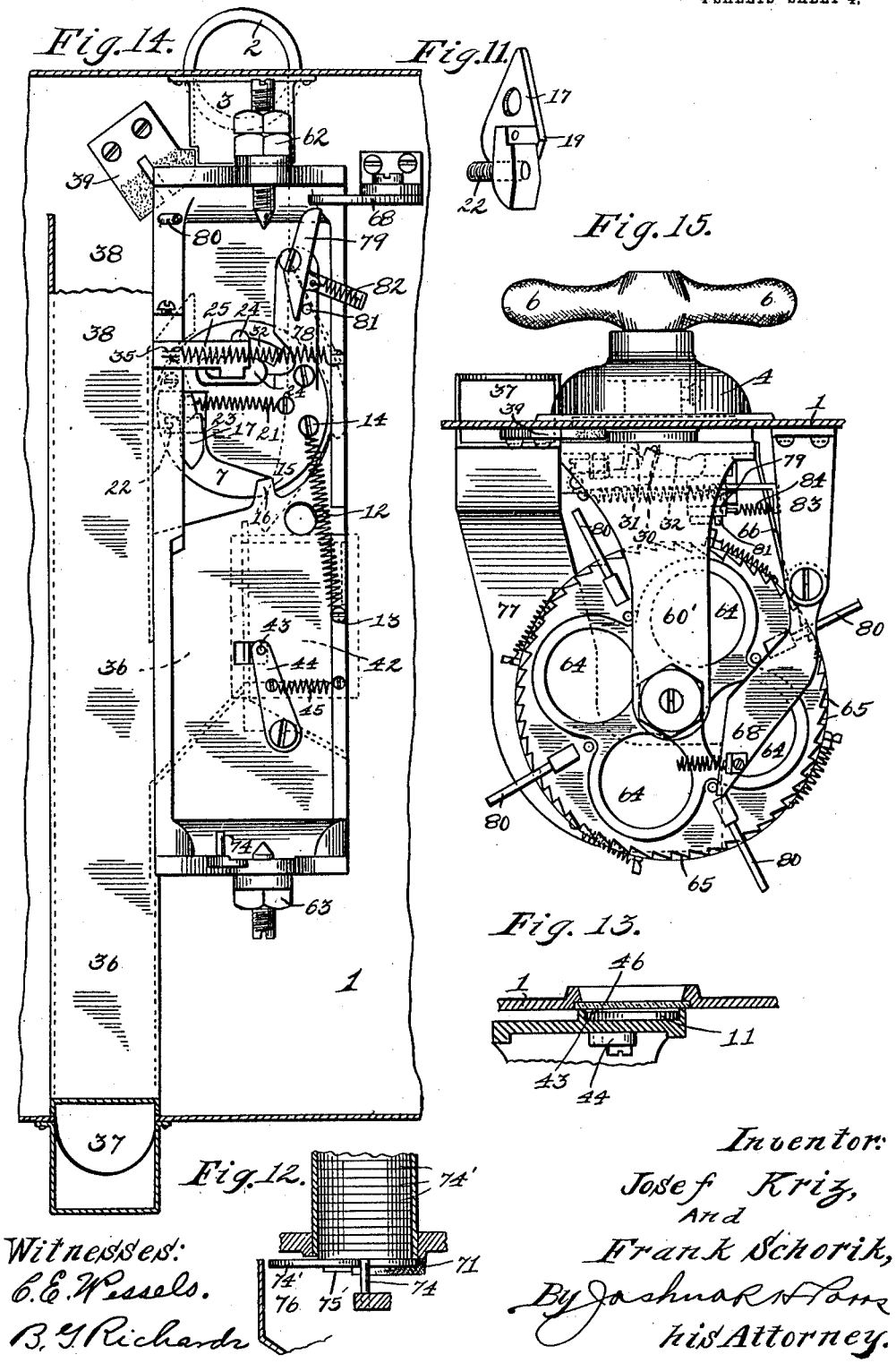

JOSEF KRIZ AND FRANK SCHORIK, OF CHICAGO, ILLINOIS; SAID KRIZ ASSIGNOR TO SAID SCHORIK.

VENDING-MACHINE.

969,883.  Specification of Letters Patent.  Patented Sept. 13, 1910.

Application filed February 7, 1910. Serial No. 542,584.

*To all whom it may concern:*

Be it known that we, JOSEF KRIZ and FRANK SCHORIK, citizens of the United States, residing at Chicago, county of Cook, and State of Illinois, have invented certain new and useful Improvements in Vending-Machines, of which the following is a specification.

Our invention relates to vending mechanism and has for its object the production of vending mechanism especially adapted to the sale of slugs for operating slug-controlled telephones or similar mechanisms.

The invention consists in the combination and arrangement of parts hereinafter described and claimed.

The invention will be best understood by reference to the accompanying drawings forming a part of this specification, and in which, Figure 1 is a sectional elevation of vending mechanism embodying our invention, Fig. 2 is a horizontal section on line $x$—$x$ of Fig. 1, Fig. 3 is an elevation of a member adapted to contain the slugs to be sold, Fig. 4 is a top plan view of Fig. 3, Fig. 5 is a bottom plan view of Fig. 3, Fig. 6 is a perspective view of the dog employed for controlling the operation of the machine, Fig. 7 is a detail elevation of the trigger arm and trigger for operating the slug containing member, Fig. 8 is an interior elevation of the coin controlled mechanism, Fig. 9 is an exterior elevation, partially in section, corresponding to Fig. 8, Fig. 10 is a top plan view of the slug containing member and coöperating parts, Fig. 11 is a perspective view of the pawl employed for retaining deposited coins in operative position in the coin-controlled mechanism, Fig. 12 is a partial section through the bottom of the slug containing member illustrating the method of discharge of the slugs, Fig. 13 is a section on line $y$—$y$ of Fig. 9, Fig. 14 is an interior elevation of a modified form of coin-controlled mechanism for operating the machine, and Fig. 15 is a top plan view corresponding to Fig. 14.

The preferred form of construction as illustrated in the drawings comprises a suitable box or casing 1 provided with suitable means for access to the interior thereto (not shown). At its upper forward portion the casing 1 is provided with an annular ring 2 having a bore adapted to receive the coin destined to operate the machine, in this case a five-cent piece or "a nickle". The opening in ring 2 leads to a coin receiving chute 3 and the ring is so situated that it projects partially above the top of casing 1 so that a coin becoming lodged or jammed therein may be readily removed by pressure from the rear. Below chute 3 the casing 1 is provided with a boss 4 in which a shaft 5 is rotatably mounted. At its outer end shaft 5 carries an operating handle 6 and at its inner end a plate 7 secured thereto by means of a hub 8 and set screw 9. The plate 7 is provided with a coin chute 10 registering with receiving chute 3 when said member is in inoperative position and adapted to contain a nickle or similar object 11. A spring 12 secured to a stationary screw 13 and a screw 14 on member 7 serves to yieldingly hold the member 7 in inoperative position with the projection 15 thereon contacting with the stationary stop 16. A retaining pawl 17 is pivoted to member 7 at 18 and is provided with a surface 19 adapted to coöperate with the side 20 of chute 10 retain a deposited coin in said coin chute. A spring 21 serves to normally hold pawl 17 in its operative position and a set screw 22 adapted to contact with a shoulder 23 on member 7 serves to nicely regulate the distance between surface 19 and side 20, so that a nickle will be retained in said coin chute but a coin of very slightly smaller diameter will pass therethrough. In its upper portion member 7 is provided with a substantially T-shaped notch 24 adapted to receive a locking dog 25 pivoted to a stationary support by a pivot screw 26. The dog 25 is provided with an inward projection 27 adapted to enter the upper portion of slot 24 and having a locking surface 28 adapted to coöperate with the side 29 of slot 24 to lock member 7 against rotation. The end 30 of projection 27 is beveled as shown and pawl 25 is provided with a pin 31 projecting into notch 24 to contact with a nickle 11 retained in coin chute 10. The relative arrangement is such that when pin 31 contacts with the coin, as shown in Fig. 2, the surface 30 is raised to a position where it is adapted to ride upon the edge of locking surface 29 upon operative rotation of member 7 to force dog 25 out of notch 24, an inclined land or riding surface 32 being provided on member 7 to continue this outward movement of dog 25 during further rotation of member 7. A spring 33 secured to stationary projection 34 and to lug 35 on dog 25 serves to yieldingly hold said dog in engagement with notch 24, the arrangement being such that when plate 7 is in inoperative position the side of projection 27 opposite to locking surface 28 rests upon the side of notch 24 opposite to locking side 29 to hold pin 31 from obstructing coin chute 10. By this construction, it will be observed that, upon deposit of a nickle in coin chute 10, the member 7 is rendered free to rotate since the pin 31 rides upon the nickle 11 until inclined surface 30 strikes the edge of locking surface 29 whereupon dog 25 is operated to permit further rotation of member 7, but that if no nickle is present in coin chute 10 the projection 27 will be drawn into notch 24 upon attempt to rotate plate 7 so that locking surface 28 will engage locking surface 29 and thus securely lock member 7 against rotation.

A delivery chute 36 is provided in casing 1 to register with coin chute 10 when the latter is in inoperative position so that if a coin or slug, smaller in diameter than a nickle, is deposited in coin chute 10 it will be passed through said chute into delivery chute 36 whence it will pass to delivery receptacle 37 located under chute 36. Receptacle 37 is open at the top so that the depositor may readily remove objects therefrom. A secondary delivery chute 38 communicates with receiving chute 3 at its upper end and at the juncture a magnet 39 is located as shown to divert iron or other magnetic slugs from coin chute 10 into delivery chute 38, whence said slug will pass to delivery chute 36 and receptacle 37 from which it may be removed. Thus it will be observed that coin of less diameter than a nickle or any magnetic slug will be conducted to delivery receptacle 37 without permitting operation of the vending mechanism. A coin larger than a nickle cannot be inserted through ring 2 so that only a true nickle or a non-magnetic slug exactly the same size as a nickle can be utilized to operate the device.

In order to insure that any true nickle deposited in the device will properly operate the same, we provide on plate 7 an upwardly extending stop member 40 adapted to traverse chute 3 on operative movement of plate 7 and intercept any non-magnetic coin or slug deposited in chute 3 during the operative movement of plate 7. The rearward side 41 of projection 40 is inclined as shown so that upon the inoperative movement of plate 7 a retained coin or slug in chute 3 will be automatically elevated to pass over said stop and pass into coin chute 10 where it will operate as before.

A retaining chute 42 is arranged in casing 1 in position to register with coin chute 10 at the end of its operative stroke and pawl 17 projects from member 7 sufficiently to contact with stop 16 to cause release of a coin retained in the coin chute 10 at the end of the operative stroke of member 7. Thus a coin employed to obtain an operative stroke of plate 7 will be automatically discharged into chute 42. The passage of a coin through chute 42 is obstructed by a pin 43 carried by a pivoted arm 44 and projecting through a slot in a wall of said chute. Arm 44 is held in operative position by means of a spring 45. A glass or other transparent plate 46 is set in the outer wall of chute 42 so as to render a coin retained by pin 43 visible from the outside. Plate 7 carries a projection 47 having an inclined cam surface 48 adapted to contact with a coin resting on top of the visible coin retained by pin 43, so that upon the inoperative movement of plate 7 cam surface 48 will operate against a coin supported on top of a visible coin to cause the discharge of the latter. Thus it will be observed that the first coin deposited and employed to operate the mechanism will be retained by pin 43 in a position for inspection until a coin is deposited on top thereof by the next operative movement of said plate whereupon the first coin will be dislodged and the new coin immediately placed in visible position for inspection. This provision will tend to prevent operation of the machine by slugs or spurious coins. Plate 7 also carries a rigid downwardly extending trigger arm 49 having a friction roller 50 adapted to contact with a bearing surface in casing 1 to alleviate friction and hold said arm in position during its operative stroke. Arm 49 also carries a trigger 51 yieldingly held in operative position against a stop pin 52 by means of a spring 53. At its outer end trigger 51 carries a roller 54 adapted to contact with and engage tubes 55 carried by upper and lower plates 56 and 57. Plates 56 and 57 are rotatably mounted on pointed screws 58 and 59 threaded in brackets 60 and 61 and held in position by lock nuts 62 and 63. Plate 56 is provided with opening 64 communicating with tubes 55, the said tubes being arranged with their centers on a circle having the axis of rotation of plates 56 and 57 for its center. The periphery of plate 56 is provided with ratchet teeth 65 adapted to be engaged by a spring pawl 66 which holds said plate and tubes against reverse rotations. Between the opening 65 plate 56 is provided with upwardly projecting pins 67 adapted to be engaged by an angularly shaped locking dog 68 pivoted to bracket 60 and yieldably held in contact with said pins by means of spring 69, as illustrated in Fig. 10. The arrangement is such that at each partial rotation or oscillation of plate 7, trigger 51 engages the side of a tube 55 and causes a partial rotation of the tubes and their connections. The operative stroke of trigger arm 49 is sufficient to carry the rear pin 67 contacting with dog 68 over the apex 70 of said dog whereupon the inclination of the forward face of said dog operative upon said pin will complete the partial rotation of said plates and tubes until the adjacent rear pin contacts with the rear inclined surface of said dog. The dog then serves to hold the tubes and plates in correct position. Thus it will be observed that upon the deposit of a nickle in coin chute 10 the tubes 55 may be caused to take a partial revolution, the trigger arm 51 snapping over the next adjacent rear tube 55 on the reverse movement of plate 7 to assume a position ready to engage said tube upon the next operation of said plate.

Plate 57 is provided with wells or pockets 71 into which the tubes 55 fit at their bottoms. Each of these wells is partially cut away at the bottom and provided with a lateral discharge slot 72 in the side thereof. A circular slot 73, with the axis of rotation as its center, is cut through the bottom of each of said wells. A pin 74 is secured in bracket 61 to extend upwardly through slot 73 into the bottom of wells 71, as shown. Spring held pawls 75 are pivoted to the bottom of plate 57 in position to contact with and yieldingly hold the bottommost of the pile of slugs 74' in each of said tubes against accidental displacement from said tube. The pin 74 is extended upwardly into wells 71 just far enough to engage the bottommost of a pile of slugs in the corresponding tube and well. Thus it will be observed that at each partial rotation of said tubes the bottommost slug in one tube will be engaged by pin 74 and held against rotation until the bottom of the corresponding well passes from under said slug whereupon said slug will fall into a receptacle 76 set to receive it. Receptacle 76 is connected by means of a chute 77 with delivery receptacle 37 so that said discharge slug will be conducted to said delivery receptacle whence it may be extracted by the depositor of the nickle. Thus it will be observed that upon the deposit of a nickle in chute 3 the handle 6 may be operated to cause the discharge of a slug placed in tubes 55 and delivery of said slug to the depositor. The slugs last mentioned may be any of the usual forms of slugs adapted to be deposited in an ordinary telephone in payment for the use thereof, the machine being especially devised for the purpose of relieving the proprietor of establishments containing the telephones from the trouble of exchanging said slugs for money and the user of the telephone from the annoyance and delay incident thereto.

In Figs. 14 and 15 we have illustrated a modified form of construction in which the plate 7 carries an upwardly extending trigger arm 78 carrying a trigger 79 contacting with a stop pin 81 and yieldingly held thereagainst by means of a spring 82. Radiating pins or rods 80 are secured to the top of plate 56 in position to be contacted and engaged by trigger 79 so that at each operation of plate 7 a partial rotation will be imparted to tubes 55. The upper bracket 60' has also been somewhat modified in shape and dog 68 is pivoted on a separate bracket 83 and held to position by means of a spring 84. Except for these changes the construction and operation of this modified form of the device is exactly the same as that previously described.

While we have illustrated and described the preferred form of construction for carrying our invention into effect this is capable of variation or modification without departing from the spirit of our invention. We therefore do not wish to be limited to the exact details of construction set forth but desire to avail ourselves of such variations and modifications as come within the scope of the appended claims.

Having described our invention what we claim as new and desire to secure by Letters Patent is:

1. In a vending machine, the combination with a rotatable member provided with a coin chute having a notch in one side adapted to admit a dog to contact with a coin therein; an adjustable spring held pawl carried by said member and adapted to retain a coin in said chute opposite said notch; a stop adapted to contact with said pawl to release said coin upon rotation of said member; a spring held dog pivoted to a stationary support and adapted to enter said notch to lock said member against rotation but to release said member when riding on a coin held in said chute; a delivery chute registering with said coin chute when said member is in inoperative position; a retaining receptacle adapted to receive a coin from said coin chute when released by said pawl; and vending mechanism adapted to be operated by rotation of said member, substantially as described.

2. In a vending machine, the combination with a rotatable member provided with a coin chute having a notch in one side adapted to admit a dog to contact with a coin therein; an adjustable spring held pawl carried by said member and adapted to retain a coin in said chute opposite said notch; a stop adapted to contact with said pawl to release said coin upon rotation of said member; a spring held dog pivoted to a stationary support and adapted to enter said notch, the said dog being provided with a locking surface adapted to engage a side of said notch when no coin is in said chute but to disengage said side when riding on a coin in said chute; a delivery chute registering with said coin chute when said member is in inoperative position; a retaining receptacle adapted to receive coins from said coin chute when released by said pawl; and vending mechanism adapted to be operated by rotation of said member, substantially as described.

3. In a vending machine, the combination with a rotatable member provided with a coin chute having a notch in one side adapted to admit a dog to contact with a coin therein; an adjustable spring held pawl carried by said member and adapted to retain a coin in said chute opposite said notch; a stop adapted to contact with said pawl to release said coin upon rotation of said member; a spring held dog pivoted to a stationary support and adapted to enter said notch, to lock said member against rotation but to release said member when riding on a coin held in said chute; a delivery chute registering with said coin chute when said member is in inoperative position; a retaining receptacle adapted to receive coins from said coin chute when released by said pawl; a receiving chute registering with said coin chute when said member is in inoperative position; a secondary delivery chute communicating with said receiving chute and with said delivery chute; a magnet arranged to divert a magnetic slug from said receiving chute to said secondary delivery chute; and vending mechanism adapted to be operated by rotation of said member, substantially as described.

4. In a vending machine, the combination with a rotatable member provided with a coin chute having a notch in one side adapted to admit a dog to contact with a coin therein; an adjustable spring held pawl carried by said member and adapted to retain a coin in said chute opposite said notch; a stop adapted to contact with said pawl to release said coin upon rotation of said member; a spring held dog pivoted to a stationary support and adapted to enter said notch, the said dog being provided with a locking surface adapted to engage a side of said notch when no coin is in said chute but to disengage said side when riding on a coin in said chute; a delivery chute registering with said coin chute when said member is in inoperative position; a retaining receptacle adapted to receive coins from said coin chute when released by said pawl; a receiving chute registering with said coin chute when said member is in inoperative position; a secondary delivery chute communicating with said receiving chute and with said delivery chute; a magnet arranged to divert a magnetic slug from said receiving chute to said secondary delivery chute; a stop member on said rotatable member arranged to stop said receiving chute during rotation of said member, the said stop member being adapted to deliver a coin held in said receiving chute to said coin chute upon the inoperative rotation of said member; and vending mechanism adapted to be operated by rotation of said member, substantially as described.

5. In a vending machine, the combination with a rotatable member provided with a coin chute having a notch in one side adapted to admit a dog to contact with a coin therein; an adjustable spring held pawl carried by said member and adapted to retain a coin in said chute opposite said notch; a stop adapted to contact with said pawl to release said coin upon rotation of said member, a spring held dog pivoted to a stationary support and adapted to enter said notch, the said dog being provided with a locking surface adapted to engage a side of said notch when no coin is in said chute but to disengage said side when riding on a coin in said chute; a delivery chute registering with said coin chute when said member is in inoperative position; a retaining receptacle adapted to receive coins from said coin chute when released by said pawl, a receiving chute registering with said coin chute when said member is in inoperative position; a secondary delivery chute communicating with said receiving chute and with said delivery chute; a magnet arranged to divert a magnetic slug from said receiving chute to said secondary delivery chute; a stop member on said rotatable member arranged to stop said receiving chute during rotation of said member, the said stop member being adapted to deliver a coin held in said receiving chute to said coin chute upon the inoperative rotation of said member; a spring held stop in said delivery chute adapted to retain a coin therein; a transparent plate set in the wall of said delivery chute in front of a coin retained therein; an operative projection on said member adapted to contact with a coin resting on the top of said retained coin to force the former past the latter on the inoperative movement of said member; and vending mechanism adapted to be operated by rotation of said member, substantially as described.

In testimony whereof we have signed our names to this specification in the presence of two subscribing witnesses.

JOSEF KRIZ.
FRANK SCHORIK.

Witnesses:
HELEN F. LILLIS,
JOSHUA R. H. POTTS.